US012464993B2

(12) United States Patent
Moskal et al.

(10) Patent No.: US 12,464,993 B2
(45) Date of Patent: Nov. 11, 2025

(54) VERTICAL HYDROPONIC SYSTEM

(71) Applicants: Kenneth David Moskal, Nuevo Leon (MX); Jose Andres Viveros Caraza, Nuevo Leon (MX); Victor Hugo Avendano Abarca, Nuevo Leon (MX)

(72) Inventors: Kenneth David Moskal, Nuevo Leon (MX); Jose Andres Viveros Caraza, Nuevo Leon (MX); Victor Hugo Avendano Abarca, Nuevo Leon (MX)

(*) Notice: Subject to any disclaimer, the term of this patent is extended or adjusted under 35 U.S.C. 154(b) by 0 days.

(21) Appl. No.: 18/554,637

(22) PCT Filed: Mar. 11, 2022

(86) PCT No.: PCT/MX2022/050016
§ 371 (c)(1),
(2) Date: Oct. 10, 2023

(87) PCT Pub. No.: WO2023/172120
PCT Pub. Date: Sep. 14, 2023

(65) Prior Publication Data
US 2024/0188518 A1 Jun. 13, 2024

(51) Int. Cl.
*A01G 31/06* (2006.01)
(52) U.S. Cl.
CPC .................... *A01G 31/06* (2013.01)
(58) Field of Classification Search
CPC ...... A01G 31/06; A01G 31/00; A01G 31/025; A01G 31/065
See application file for complete search history.

(56) References Cited

U.S. PATENT DOCUMENTS

| 11,778,964 | B2* | 10/2023 | Oh ........................ | A01G 31/02 47/60 |
| 2013/0247462 | A1* | 9/2013 | Leslie .................... | A01G 9/247 47/82 |
| 2017/0258022 | A1 | 9/2017 | Nedbalek | |

(Continued)

FOREIGN PATENT DOCUMENTS

RU            2730648            8/2020

*Primary Examiner* — Kristen C Hayes
(74) *Attorney, Agent, or Firm* — Defillo & Associates, Inc.; Evelyn A. Defillo

(57) ABSTRACT

A vertical hydroponic system with environmental control for horticultural production including a plurality of production structures with levels for separation of the production seedlings and short species. Each level contains a stainless-steel tray and a high-density polyethylene plastic liner. Each stainless steel tray and high density polyethylene plastic liner contain an insert through hole and a draining-filling system with a plurality of fill-drain lines connected to each of the plurality of stainless steel trays and high-density polyethylene liner through the insertion through holes, a central pumping-filtering-disinfection system; a hydraulic pump; a ring filter; and a UV lamp for disinfection of the nutrient solution and elimination of microorganisms that are pathogenic for plants; an automated LED lighting system having a plurality of modules each with at least two tubular LED lamps. Each tubular LED lamp is designed considering red and white horticultural diodes with specific light intensity and red:blue spectrum ratio.

7 Claims, 8 Drawing Sheets

(56) References Cited

U.S. PATENT DOCUMENTS

2022/0322625 A1* 10/2022 Adams ................ A01G 31/06
2023/0105146 A1*  4/2023 Mora ................... A01G 31/02
                                                    47/62 A

* cited by examiner

VERTICAL HYDROPONIC SYSTEM

CROSS REFERENCE TO RELATED APPLICATION

This application is a national stage entry of PCT/MX2022/050016 filed Mar. 11, 2022, under the International Convention.

TECHNICAL FIELD OF THE INVENTION

The present invention is related to the industrial sectors of protected horticulture production which allows the commercial exploitation of different plant species in part or in all of their growth stage using minimal resources. Particularly, the present invention refers to a vertical hydroponic system with environmental control for horticultural production, which allows the reduction of the production cycle with uniform growth and high-quality products, stable continuous production planning and less use of resources compared to the conventional systems.

BACKGROUND OF THE INVENTION

At present, different agricultural production systems in controlled environments are known in the state of the art, both as a whole and in its constituent elements. These systems have the great disadvantage of requiring large operating capacities, overly sophisticated technology, high investments, and unsustainable production. In addition to presenting the main challenges of increasing the efficient use of light, reducing electricity consumption and finding products that generate better profitability.

Regarding the system as a whole, two types can be found: open (they allow an interaction between external conditions and the production area, mainly for the injection of CO2, light and elimination of ambient humidity) and closed (there is no interaction between the environment and the cultivation area, includes CO2 generating equipment and dehumidifiers), the latter is mainly considered for extreme environments (eg areas with very low or null agricultural productive potential).

As its internal elements, you can mainly find:

Different techniques and hydroponic systems ranging from aeroponics, floating root, NFT (Nutrient Film Technique), drip (use of different substrates) and wick. From the point of view of the verticality of the hydroponic system, you can find vertical cylindrical designs (fixed or hanging), triangular towers based on plastic pipes and towers by stacked levels (trays, pipes or gutters) using metal structures (racks).

Different lighting systems that can be lamps based on high or low power light emitting diodes (LEDs), fluorescent lamps and to a lesser extent high pressure sodium lamps. As for their shape, they can be found as bulb, rectangular, quadratic and tubular types.

Different temperature control systems that can be classified into central systems and air conditioning systems.

Different types of environmental humidification systems: the ultrasonic type, the electrode type and the evaporation type.

Types of automated control systems. There is a great diversity of software-hardware that allow monitoring, controlling and recording environmental variables and nutrient solution that allow optimal growth conditions for plants; The disadvantage of these systems is that they increase to a greater or lesser degree (depending on the type of system used) the investment cost due to the high prices of these software (licenses, training, etc.) and hardware.

According to the previous, as to the open-type systems, which allow the entering of natural light, generate a lack of control in this variable, since the intensity and quality of light changes during the day, as well as during the different times of the year, generating problems of variability in the final characteristics of the crop from one production cycle to another and consequently loss of added value to the final product. In addition to this, infrared radiation (sensible heat) is allowed to enter, which is not useful for the plants and which raises the temperature of the internal environment, which must be removed by the cooling system, generating greater consumption of electrical energy. In closed systems, due to the fact that there is no interaction between the external environment and the cultivation area, equipment for the generation of $CO_2$ and dehumidifiers must be included to eliminate excess environmental humidity generated by the transpiration of the plants, this increases the cost of production (greater consumption of electrical energy, cost of $CO_2$ generation by injection or combustion and equipment maintenance requirement), as well as an increase in the amount of initial investment.

In the case of the hydroponics technique, aeroponics presents the disadvantage of very frequent changes in the value of the pH variable (hydrogen potential) of the nutrient solution (variable on which the availability or non-availability of nutrients for plants depends) due to its interaction with $CO_2$ in the microenvironment. This parameter directly influences the availability of nutrients for the plant and if it is not controlled in the range of 5.5 to 6.5 of measured pH, nutrient deficiencies occur in the crop that generates a loss of added value; Therefore, frequent monitoring and adjustment of the pH is required under this technique. Another important factor to consider is the requirement for a nutrient solution pressurization and nebulization system that ensures an adequate size of water drop for a good distribution of nutrients and oxygen to the entire root, as well as uniformity of application in each one of the cultivated plants.

The NFT technique, for its part, presents the main disadvantage of requiring a constant flow of nutrient solution (NS), generating a higher production cost due to the use of a hydraulic pump which must be permanently on to make this movement possible, in addition to this, it is necessary to consider possible cuts or interruptions in the electricity service since if this occurs, the crop can be lost in a very short time due to dehydration.

Another important factor to consider is the difficulty in cleaning the system if said system uses pipes or plastic gutters due to their tightness and difficult access.

Regarding the floating root technique, it presents less variability of the pH value and the EC (electrical conductivity) in comparison with the previous techniques, but it presents the great disadvantage of a decrease in the dissolved oxygen of the nutrient solution due to the stagnation thereof, thus, it is required the use of air pumps to maintain good oxygenation in the root area of the plant, which increases the consumption of electrical energy.

As to the drip system, the main disadvantage is that there may be a non-uniformity in the irrigation application due to the effect of gravity (upper part of the tower with less amount of water applied and lower parts of the tower with a greater amount of water applied) in addition to possible clogging of drippers due to salts present in the nutrient solution, thus, its use in this type of nutrient solution application is less frequent in this type of systems.

Similarly, conventional artificial lighting systems, regardless of the shape of the lamp, the light characteristics that they emit represent one of the greatest challenges for agricultural production, due to the fact that the light condition (quality, intensity and photoperiod) have a very important effect on the growth and development of crops.

As for high pressure sodium and fluorescent lamps, they have great disadvantages such as useful life (24,000 and 10,000 h respectively) and the most important of not being able to control the quality of emitted light (light quality understood as the electromagnetic spectrum emitted by the lamp that affects the canopy of the leaf and that will be the source of energy for the plant to carry out the process of photosynthesis). Being the wavelengths of red (610-750 nanometers) and blue (400-520 nanometers) the most efficient for the photosynthesis process.

On the other hand, the disadvantages of central air conditioning systems is that if there are no distribution ducts, it is necessary to carry out an installation that can be expensive and significantly modifies the structure of the production area, since perforations must be made in the ceilings, floors and walls to insert the ventilation ducts. In the same way, their efficiency is lower, since they will end up heating or cooling areas that are not necessarily used for production, in addition to the fact that ducted systems present an energy loss of 30 percent as the air moves through the ducts.

As for Mini Split air conditioning systems, they have greater advantages compared to central systems, highlighting energy savings (inverter technology), availability of different cooling capacities that allows adjustment to different production surfaces and ease of installation, in addition to having the possibility of being controlled remotely. The main disadvantage regarding its use in agricultural production systems is its great dehumidifying power (removal of moisture from the air), which if not controlled, it can generate stress in plants due to the generation of a very high vapor pressure deficit that increases the evapotranspirative demand of the air and consequently a stress in the cultivated plant species.

Likewise, in the state of the art there are three types of humidifiers: 1) electrode humidifiers, 2) evaporative humidifiers and 3) ultrasonic humidifiers. Regarding electrode-type humidification, these devices generate water vapor by boiling process through the use of electrical resistances, these humidifiers have the disadvantage of being dangerous because the vapor that it expels has a high temperature, and have a high electrical consumption, as well as a non-adjustable output flow (amount of water evaporated). As for the evaporation type humidifier, these devices generate a lower flow compared to the ultrasonic one and it is not adjustable and works only with distilled water since, if it contains salts, the wick is easily clogged, and have the disadvantage of a higher consumption of energy and little volume of evaporated water. Finally, the ultrasonic humidifier requires water with a low content of dissolved salts. Currently on the market there are programmable ultrasonic humidification equipment (with independent control), in this case these equipments are not suitable for conventional systems because they cannot be connected to a relative humidity controller.

In accordance with the above, there are, for example, patent documents KR20200106792A, US2017258022A1 and RU2730648C1, which disclose hydroponic systems that use floating platforms, active injection of oxygen into their nutrient solution trays (containers) and use various intakes for the filling and draining of nutrient solution, in the same way, the positioning of the trays is in zigzag, which does not allow the commercial exploitation of different plant species in part or in all of their growth stage such as germination, seedling production, rooting, climatization stage post in vitro culture or strawberries production, leafy vegetables, aromatic species, etc., in addition to the problems already mentioned.

Therefore, in the state of the art there is no vertical hydroponic system with environmental control for horticultural production, which allows the reduction of the production cycle with uniform growth and high-quality products, stable continuous production planning and a lower use of resources compared to conventional systems.

OBJECTS OF THE INVENTION

It is therefore an object of the present invention to provide an environmental controlled vertical hydroponic system for horticultural production, which is a semi-open system, where only air extraction (use of an exhaust fan) is allowed to control the excess of relative humidity and maintain an ambient $CO_2$ concentration between 350 and 400 ppm avoiding the use of $CO_2$ generators.

Another object of the invention is to provide a vertical hydroponic system with environmental control for horticultural production that provides greater versatility in the nutrient solution application technique through a combination of NFT system and floating root, by means of a particular arrangement of metal trays with a high-density polyethylene-based plastic cover stacked with the help of a metal shelf-type structure that together form the production rack, wherein the trays are interconnected by a draining-filling system designed and built with conventional pipes and accessories.

An additional object of the present invention is to provide a vertical hydroponic system with environmental control for horticultural production that includes a UV light disinfection system at the outlet of the hydraulic pump for disinfection of the water from the nutrient solution and elimination of microorganisms that can be pathogenic for plants, as well as to control the population of algae that can generate the sequestration of essential nutrients for the cultivated plants.

Another additional object of the present invention is to provide a vertical hydroponic system with environmental control for horticultural production comprising an artificial LED lighting system that emits electromagnetic wavelengths (measured in nm) at suitable intensities (measured in µmoles/m2/s) adjusted to the requirements of the plant to provide a higher quality light source, improving the efficient use of electrical energy, wherein the lamps are designed with a greater length to cover a greater production area per unit (level) with better features in the emission of light, which contemplate the main relationships of the electromagnetic spectrum (Red: Blue and Red: Far Red) that directly influence the growth of crops, in addition to contemplating the radiation of the electromagnetic spectrum corresponding to the green color that promotes a better photosynthetic rate and foliar expansion and also helps to control flowering, to stimulate the production of secondary metabolites (nutraceutical properties) and increase resistance to diseases Still another object of the present invention is to provide a vertical hydroponic system with environmental control for horticultural production, which comprises an ultrasonic humidifier controlled by an ambient relative humidity controller to turn it on and off, which allows maintaining a stable relative humidity in the production area, as well as a saving of electrical energy due to its low operating time.

SUMMARY OF THE INVENTION

These and other objects are achieved through a vertical hydroponic system with environmental control for horticultural production, which is mainly conformed by:
- a plurality of production structures each comprising:
  - a plurality of levels with an adequate separation for the production of seedlings and short species, wherein each level contains a stainless steel tray with a fold to facilitate handling; a black high-density polyethylene plastic liner, wherein the black color is used to control the proliferation of algae, said black liner is configured to serve as a lining or cover for the stainless steel tray, which includes reliefs to improve the hydration of the substrate, avoid damage to the root of seedlings and improve the drainage of nutrient solution, wherein each tray includes inside four propagation containers for seedling production, which allow a total of 960 seedlings per level; and a corrugated plastic lid with perforations at different densities configured for the insertion of baskets for hydroponic production, for crop production using the floating root-NFT hybrid technique;
  - wherein each stainless-steel tray and high-density polyethylene plastic liner contains an insert through hole; and
  - a draining-filling system conformed by a plurality of fill-drain lines connected to each of said plurality of stainless-steel trays and high-density polyethylene liner through the insertion through holes, wherein each fill-drain line comprising:
  - a flange that joins the high-density polyethylene plastic liner to the stainless steel tray, said flange comprises an upper basket that acts as a pre-filter to remove substrate particles and plant debris, said flange is fluidly connected to a pipe with a flexible part that allows the horizontal displacement of the stainless steel tray by means of a rail with a safety stop to facilitate harvesting activities, and another rigid part with a flexible PVC universal nipple, wherein said nipple has the function of a trap to facilitate their separation in maintenance and cleaning activities;
  - a reducer coupling having installed a stop valve, wherein these elements are located in each one of the plurality of levels to contain the nutrient solution or control the filling-draining of the tray;
  - a central pumping-filtering-disinfection system, comprising a water tank; a hydraulic pump; a ring filter; and a UV lamp configured for disinfection of the nutrient solution and elimination of microorganisms that may be pathogenic for plants, as well as to control the population of algae that may generate nutrient sequestration; and a pipe for conducting nutrient solution that allows, by combining the opening or closing of stop valves, the use of only said single hydraulic pump and a single pipe for distribution to each of the plurality of filling and drained lines from the trays containing the nutrient solution;
  - an LED lighting system, conformed by a plurality of modules each with at least two tubular LED lamps, wherein each of said plurality of modules is placed on each level of said plurality of levels located and fixed in a parallel position to the stainless steel tray by means of fastening clips which allow to modify the separation height between lamp and canopy of the plant to adjust the light intensity and allow saving electrical energy; wherein each tubular LED lamp is designed considering red and white horticultural diodes with specific light intensity and red:blue spectrum ratio;
  - a hot/cold temperature control system with inverter technology; and
  - a relative humidity control system, conformed by an air extractor, an ultrasonic humidifier for horticultural applications with a tray for containing water and a fan for the distribution of water vapor; and a digital controller with an alarm and control of two actuators system, one for the humidifier and the other for the extractor, which are activated if the established value is different from the current environmental reading with a margin established by the user, which allows to manipulate the degree of permissible variability of the ambient relative humidity based on the cultivated plant species.

The additional features and advantages of the invention should be more clearly understood by means of the detailed description of the preferred embodiment thereof, given by means of a non-limiting example with reference to the attached drawings, in which:

DETAILED DESCRIPTION OF THE INVENTION

In accordance with the present invention, the proposed vertical hydroponic system with environmental control for horticultural production is a horticultural production model that allows the commercial exploitation of different plant species in part or all of their growth stage (germination, production seedling, rooting, post-in vitro culture climatization stage or strawberries production, leafy vegetables, aromatic species, etc.) using minimal resources (water, fertilizers, energy and space) at the required time, to achieve greater efficiency in the use of inputs, space optimization and cost reduction, obtaining high quality products and better agronomic features than traditional systems. All of the above from the control of environmental variables that directly influence the growth of the crops such as temperature, relative humidity, vapor pressure deficit, wind speed, $CO_2$ concentration and light condition (quality, intensity and photoperiod), as well as nutritional control through hydroponics (agricultural production without soil).

Among the advantages of this system, the following are highlighted: 1) reduction of the production cycle with uniform growth and high quality products, 2) stable continuous production planning and 3) less use of resources compared to conventional systems.

Referring now to FIGS. 1-6, the vertical hydroponic system with environmental control for horticultural production of the present invention is shown generally numbered at 1000. Said vertical hydroponic system 1000 is generally conformed by a plurality of production structures 1100; a draining-filling system 1200; a central pumping-filtering-disinfection system 1300; a LED lighting system 1400, a hot/cold temperature control system with inverter technology 1500; a relative humidity control system 1600; and an air movement system 1700 formed by a plurality of fans to homogenize environmental variables throughout the production area, such as temperature, relative humidity, vapor pressure deficit and $CO_2$ concentration.

Figure 2:
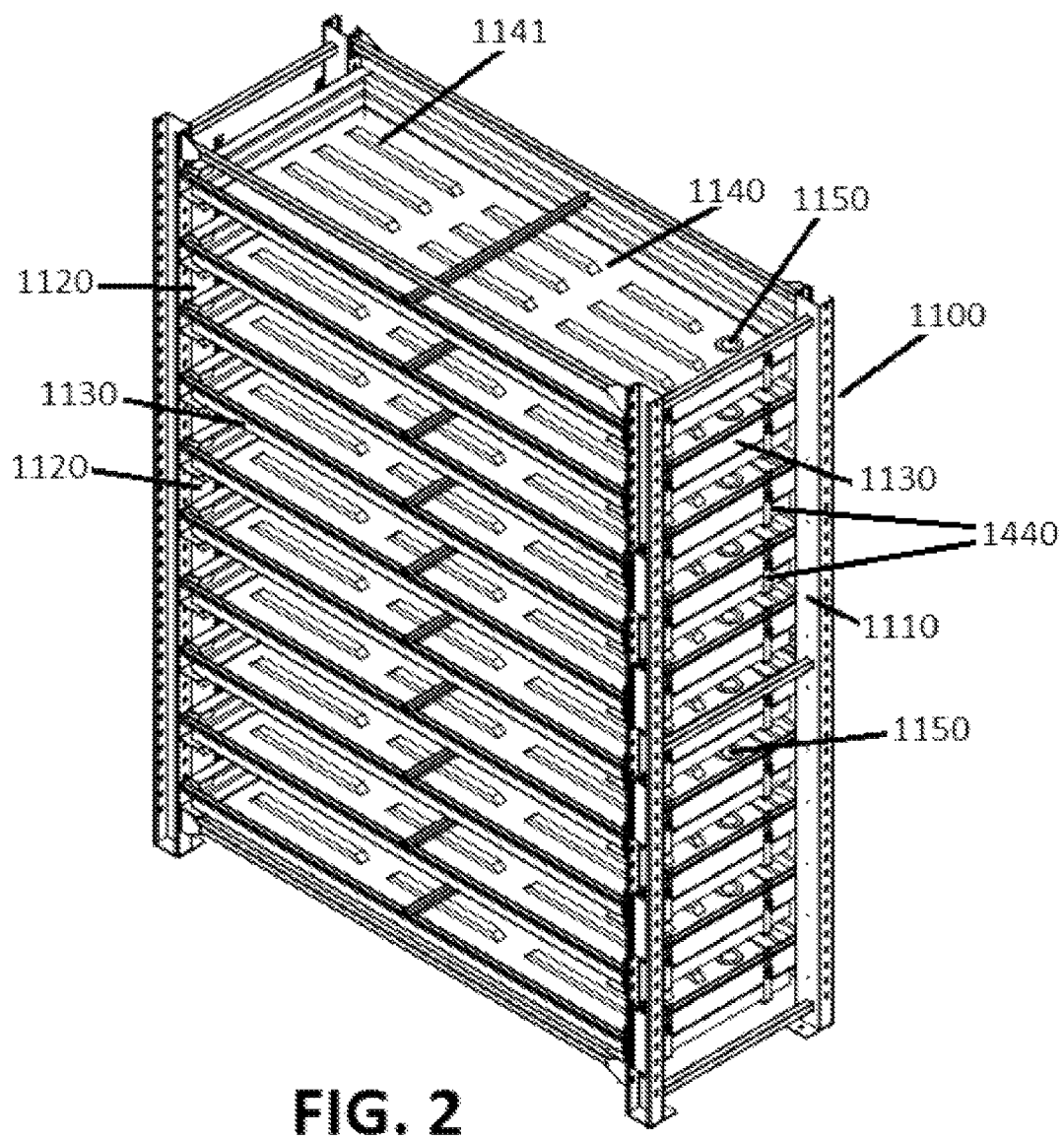
FIG. 2 is a perspective view of the production structure of the vertical hydroponic system with environmental control for horticultural production of the present invention.
Figure 2A:
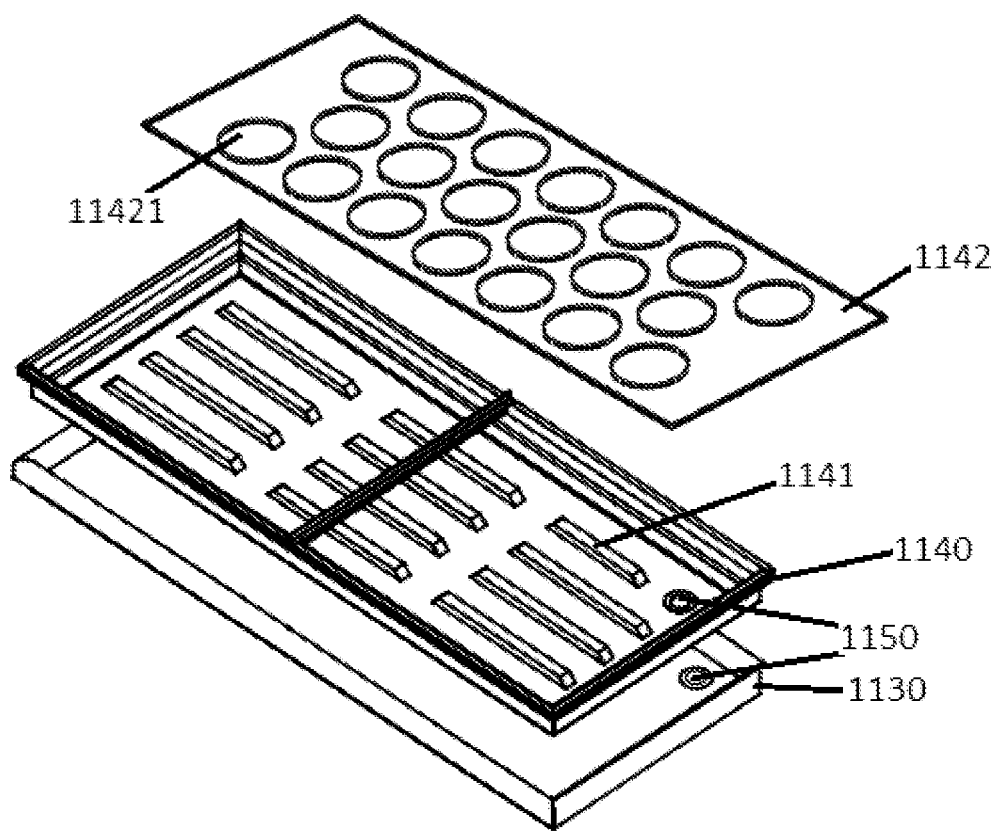
FIG. 2A is a perspective view of the stainless-steel tray and high-density polyethylene plastic tray with a corrugated plastic lid with perforations at different densities for inserting baskets, when the tray is used for crop production using the hybrid floating root-NFT technique.
Figure 2B:
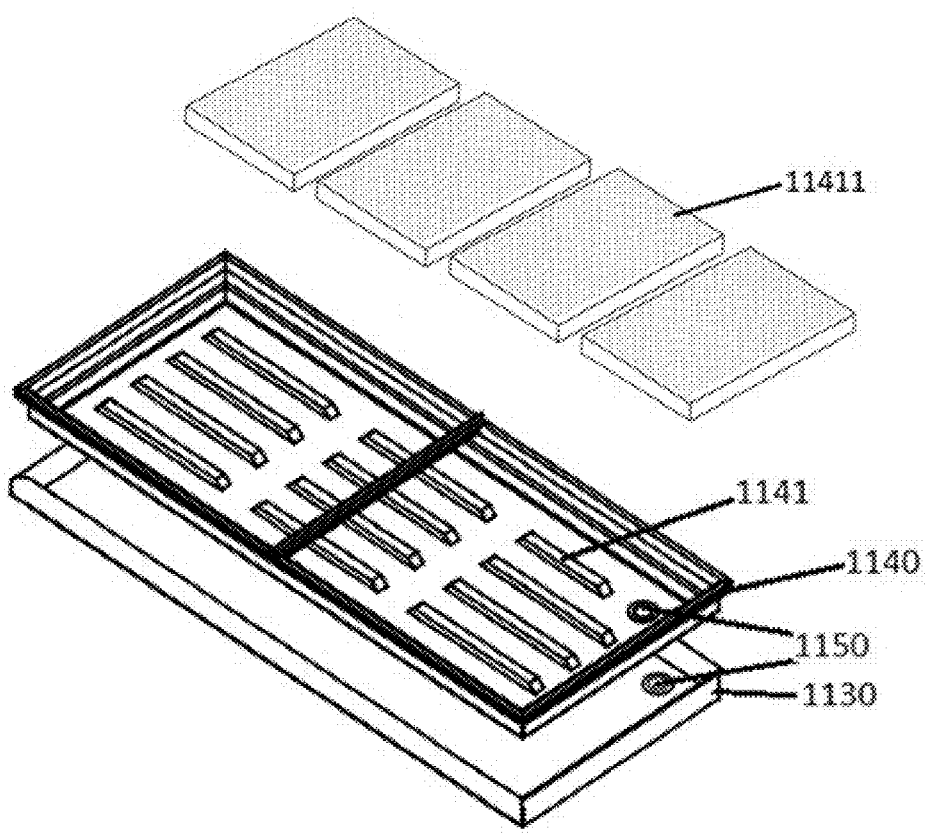
FIG. 2B is a perspective view of the stainless-steel tray and high-density polyethylene plastic tray with four propagation containers when the tray is used for seeding production.

As shown in FIGS. 2, 2A, and 2B, each one of the plurality of production structures 1100 comprising a base frame 1110 formed by four stainless steel angle posts with perforated flange for anchoring to the ground, tray holder angles forming production levels 1120, all fastened with screws, washers and lock nuts (not shown), wherein each production level 1120 comprising a separation distance between levels suitable for the production of seedlings, leafy vegetables, strawberries and other short species, as well as medicinal plants (with high economic value) used in pharmaceuticals and cosmetics, well known in the state of the art. Each production level 1120 comprises at least one stainless steel tray 1130 with a fold for easy handling, which is covered by a black high-density polyethylene plastic liner 1140 to control algae proliferation, and which is configured to serve as a liner for the stainless steel tray, each plastic liner 1140 comprising a plurality of reliefs 1141 to improve the hydration of the substrate (when used for seedling production), avoid damage to the root of seedlings when handling the propagation trays and improve drainage of nutrient solution. As shown in FIG. 2B, the size of the tray 1130 is designed to contain a total of four propagation containers 11411 for a total of 960 seedlings per level, when the tray is used for seedling production. Additionally, as shown in FIG. 2A, said plastic liner 1140 comprises a corrugated plastic lid 1142 with perforations 11421 at different densities, configured for the insertion of baskets for hydroponic production, for crop production using the floating root-NFT technique (not shown), wherein the plastic lid 1142 also serves as protection to prevent the entry of radiation that allows the proliferation of algae, also providing darkness for better root development.

Each stainless-steel tray 1130 and high-density polyethylene plastic liner 1140 including an insert through-hole 1150 for installation of the draining-filling system 1200. The positioning of the trays is completely horizontal and are stacked vertically, which offers greater advantages, in addition to the fact that they are not fixed to the structure 1100, since they are supported by the pair of opposite angles also provided with a rail with a safety stop, which allows the horizontal displacement of tray 1130, in order to be partially drawn (not shown) through said rail to facilitate harvesting activities.

Figure 3:
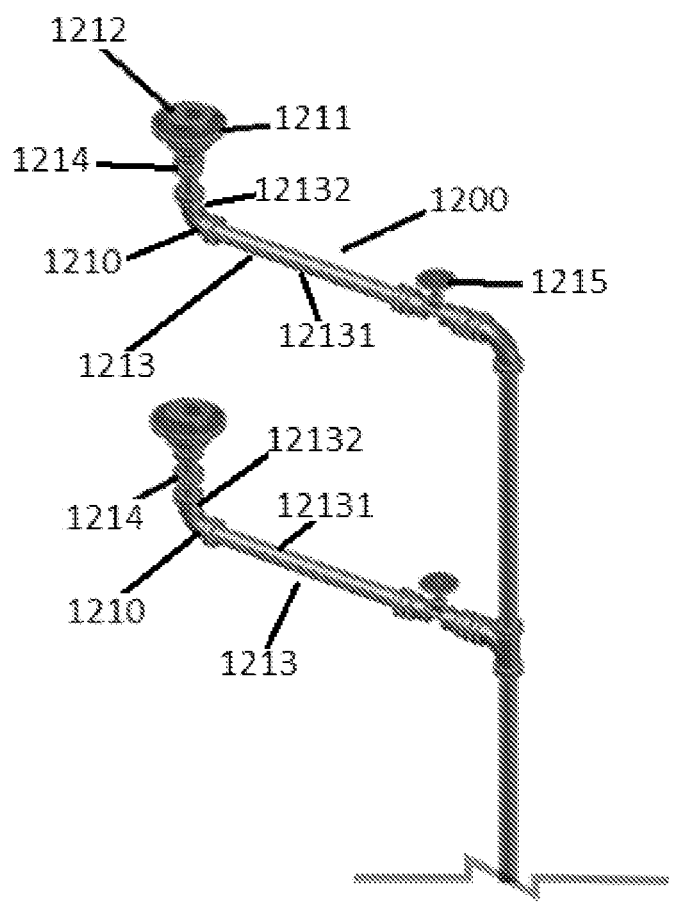
FIG. 3 is a detailed view of the draining-filling system of the vertical hydroponic system with environmental control for horticultural production of the present invention.

Referring now to FIG. 3, the draining-filling system 1200 is shown, conformed by a plurality of draining-filling lines 1210 connected to each of said plurality of stainless-steel trays 1130 and high-density polyethylene liners 1140 through the insertion through holes 1150, wherein each draining-filling line comprises a flange 1211 that joins the high-density polyethylene plastic liner 1140 to the stainless-steel tray 1130. Said flange 1211 comprises an upper basket 1212 that serves as a pre-filter media to remove substrate particles and plant remains, said flange 1211 is connected to a distribution/discharge pipe 1213 with a flexible part 12131 to allow horizontal displacement of the production tray by means of said rail with safety stop and another rigid part 12132 with a flexible PVC universal nipple 1214, having the function of a trap to facilitate its separation in maintenance and cleaning activities. After said nipple 1214 there is a reducer coupling where a stop valve 1215 is installed. All these elements are found in each of the levels to contain the nutrient solution or control the filling-draining of trays 1140. The connection between the lines 1210 and the levels of the structure is carried out using pipes and conventional accessories.

Figure 4:
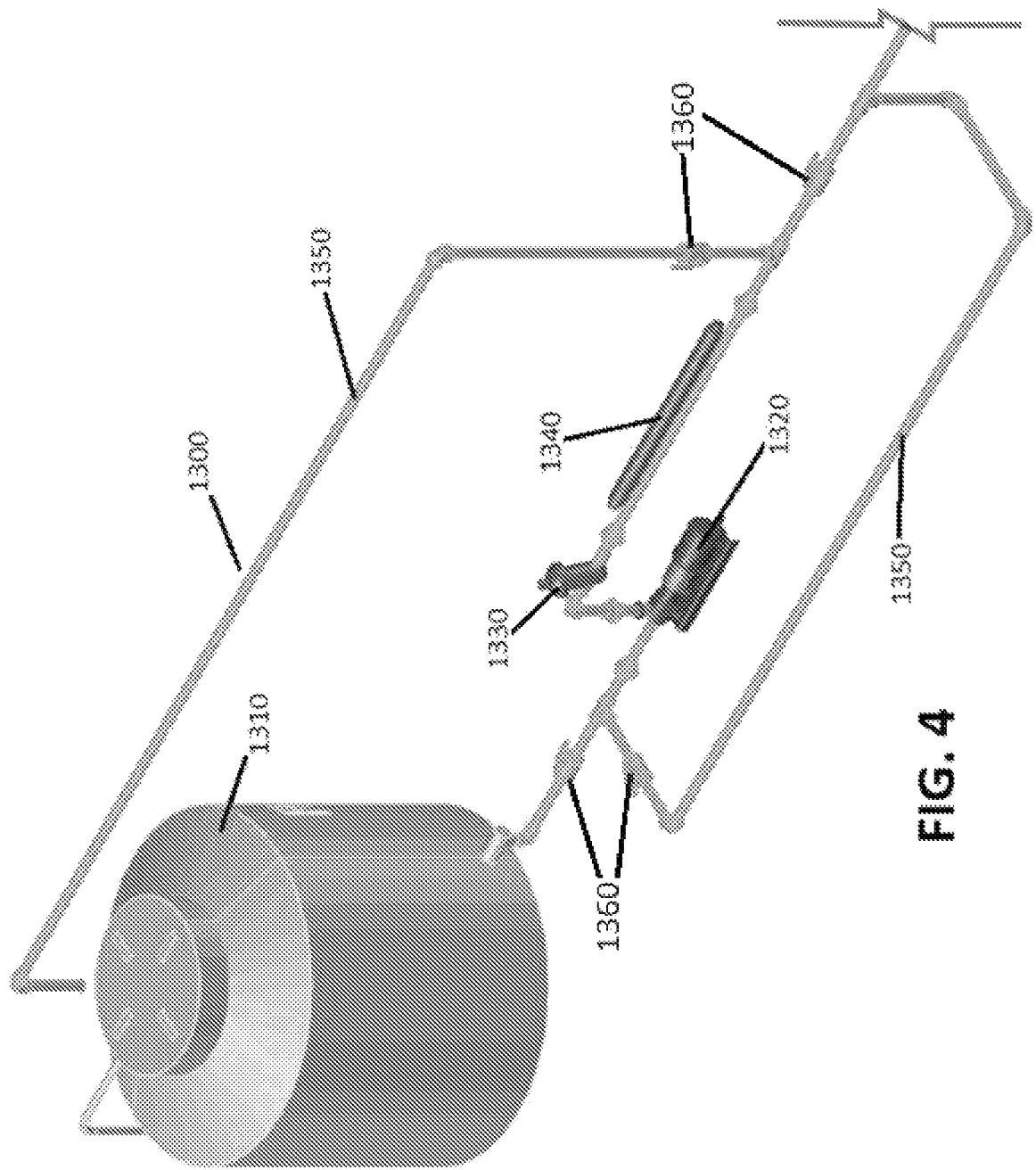
FIG. 4 is a general schematic view of the central pumping-filtering-disinfection system of the vertical hydroponic system with environmental control for horticultural production of the present invention.

Referring to FIG. 4, the central pumping-filtering-disinfection system 1300 is shown, which is conformed by a water tank 1310, in fluid connection with a hydraulic pump 1320, a ring filter 1330, and an UV lamp 1340 which form a filtering and disinfection media of the water for the elimination of algae by means of UV radiation, accessories, pipes and CPVC stop valves, wherein the design and arrangement of the pipe for the conduction of nutrient solution 1350 allows that by combining the opening or closing of a plurality of stop valves 1360, it is only required the use of a single hydraulic pump 1320 and a single pipe line 1350 for filling and draining the trays 1140 containing nutrient solution, in addition to be able to carry out the filtering and UV disinfection process both in filling and draining.

The 1300 central system contemplates a free fall of nutrient solution to the tank 1310, which allows a passive oxygenation avoiding investment costs in active oxygenation systems and operating costs due to greater consumption of electrical energy due to the use of air pumps.

Further to the above, the system contemplates the use of union nuts for quick connection-disconnection of the filter, pump and UV lamp to carry out maintenance and cleaning activities.

Figure 1:
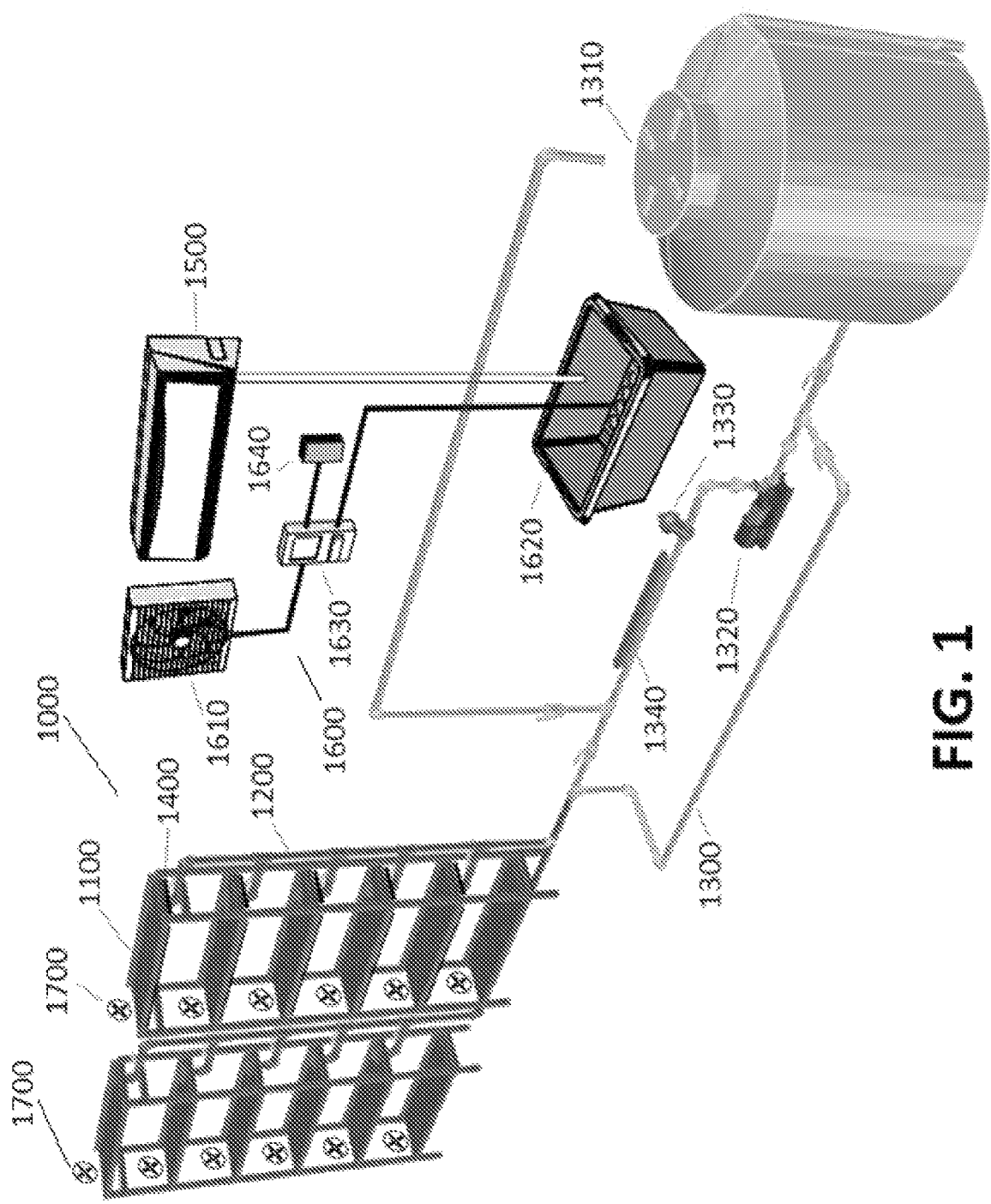
FIG. 1 is a general schematic view of the vertical hydroponic system with environmental control for horticultural production of the present invention.
Figure 5:
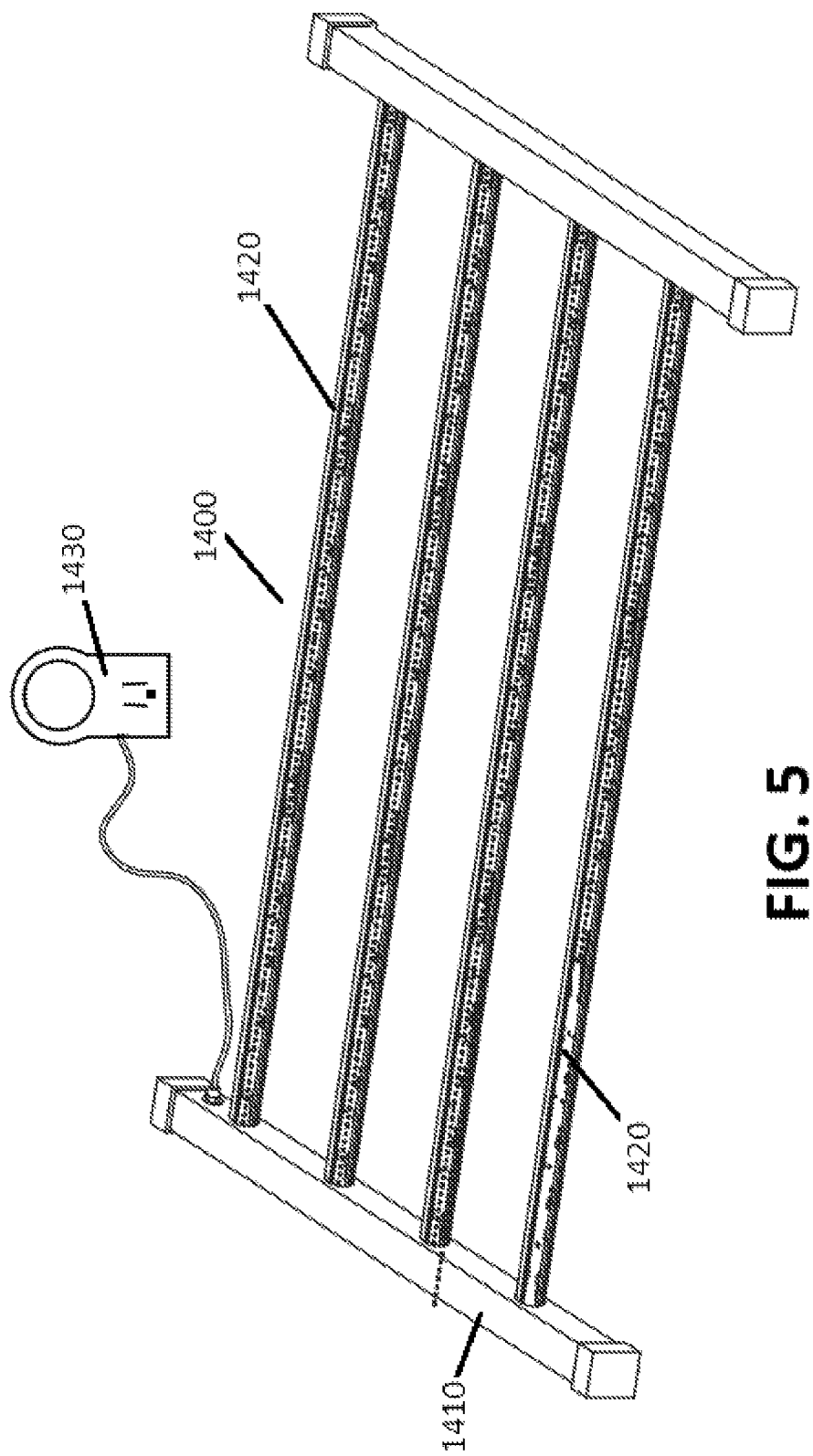
FIG. 5 is a detail view of a module of the LED lighting system of the vertical hydroponic system with environmental control for horticultural production of the present invention.

Referring now to FIGS. 1 and 5, the LED lighting system 1400 is shown, wherein as can be shown each production level 1120 comprising a module 1410 with four tubular LED lamps 1420 arranged equidistant from each other. Each 1410 lamp module is fixed in parallel position to the stainless-steel tray 1130 by holding clips 1440 shown in FIG. 2, these holding clips allow modifying the separation height between the lamp and the plant canopy to adjust the light intensity and allow energy saving. The lamps 1420 present an diode arrangement designed to obtain a lamp with the optimal length and light emission features for crop growth in the production structure 1100. The lamp 1420 was designed considering red and white horticultural diodes with light intensity and specific red:blue spectrum ratio.

The connection of the lamp modules between levels is performed using multi-contacts which are controlled by two timers 1430 for the automated switching on and off thereof, wherein each timer controls five levels of the production rack. The daily integral light to be established depends on the cultivated plant species.

The automated LED lighting system 1400 of the invention uses the most recent artificial lighting technology in the field of agriculture (light-emitting diodes), which have the great advantage of emitting wavelengths adjusted to the requirements of the plant to provide a higher quality light source, improving the efficient use of electrical energy, wherein for the present invention longer wavelength lamps were designed to cover a larger production area per unit (level) with better light emission features, which contemplates the main relationships of the electromagnetic spectrum (Red: Blue and Red: Far Red) which influence directly the growth of the crops, in addition to contemplating the radiation of the electromagnetic spectrum corresponding to the green color promoting a better photosynthetic rate and leaf expansion and which also helps to control flowering, stimulate the production of secondary metabolites (nutraceutical properties) and increase the resistance to diseases. This developed technology guarantees a longer useful life compared to conventional artificial light sources (30,000 h).

In addition to the improvements in light emission features, the lamp carrier module 1410 was designed to be easily connected and anchored to the production structure 1100 to facilitate its installation, ensuring a good distribution of the lamps to maintain a uniform lighting on each level and production area.

Figure 6:
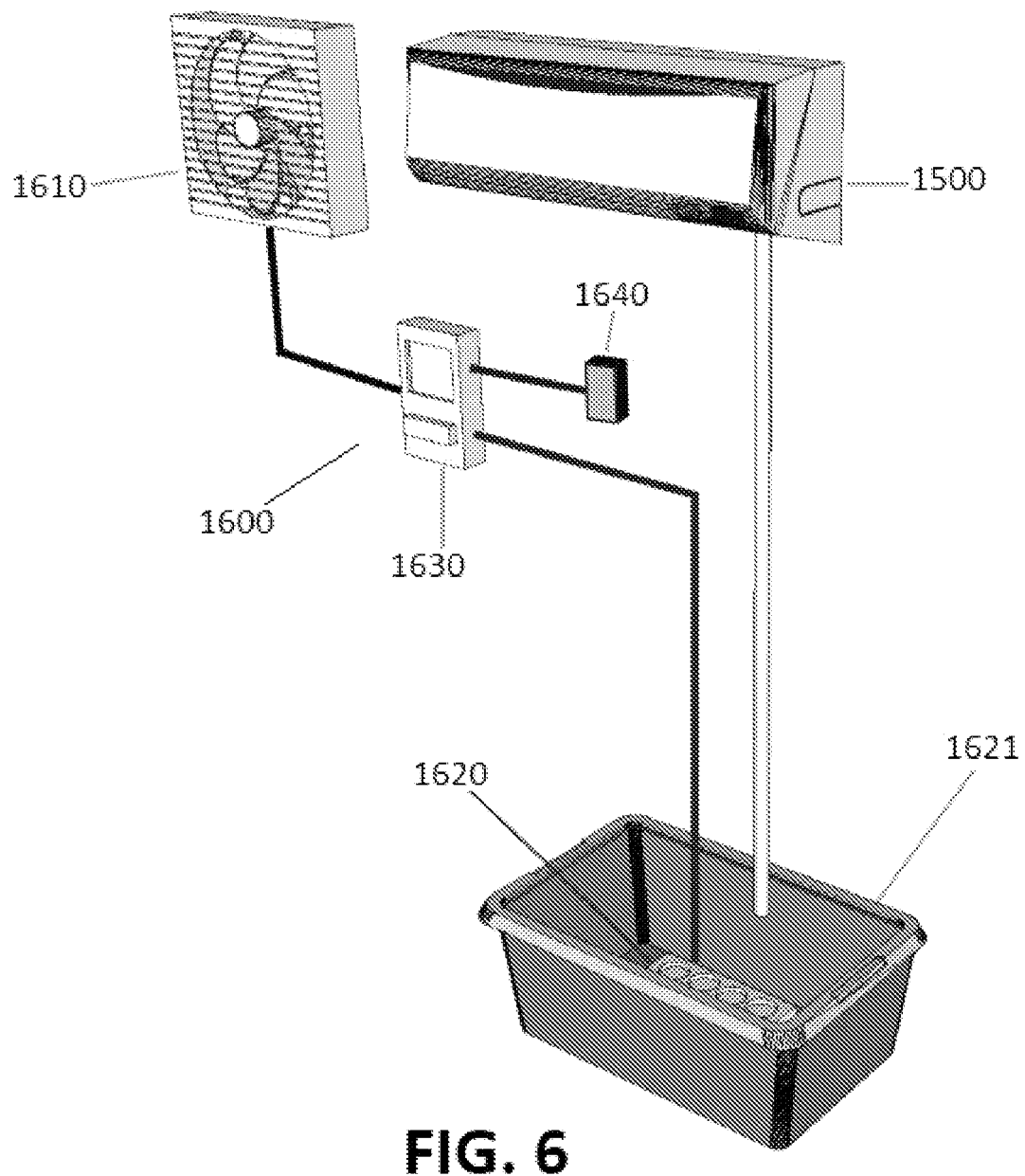
FIG. 6 is a schematic view of the hot/cold temperature control and relative humidity control systems of the vertical hydroponic system with environmental control for horticultural production of the present invention.

Referring to FIGS. 1 and 6, the temperature control 1500 and relative humidity control systems 1600 are shown. The temperature control system 1500 established for the production system is a hot/cold Mini Split with inverter technology. It is important to mention that the capacity and number of equipment depends on the number of installed production structures, the country area in which the production system is located, as well as the surface to be cooled. Said temperature control system 1500 with inverter system presents several advantages in terms of equipment costs and ease of installation, and a low annual maintenance cost.

The relative humidity control system 1600 is conformed by a 1610 exhaust fan, a ultrasonic humidifier 1620 for horticultural applications with a tray 1621 for containing water and a fan for vapor distribution and a digital controller 1630 with an alarm and control of two actuators system, (one for the humidifier and one for the extractor), which are activated if the established value is different from the current environmental measuring recorded by a relative humidity sensor 1640 with an activation margin established by the user, which allows to manipulate the degree of permissible variability of the environmental relative humidity based on the cultivated plant species. The use of said ultrasonic humidifier with a flow rate up to 4.5 L/h controlled by an environmental relative humidity controller for turning it on and off allows maintaining a stable relative humidity in the production area, as well as saving electricity due to its low functioning time.

Depending on the area in which the production system is established and the variability of the relative humidity in the different seasons of the year, the use of a dehumidifier is contemplated. It is important to note that the humidifier's water supply comes from the water condensed by the cooling system through the drain tube as shown in FIG. 6.

On the other hand, the arrangement of the draining-filling system 1200 of the invention allows the connection between all production levels of one or more production structures 1100 contemplating a single central pumping-filtering-disinfection system 1300. The inclusion of this system offers the great advantage of performing passive oxygenation through free fall of the nutrient solution to the central tank, thereby eliminating the use of air pumps. Likewise, the central tank 1310 allows the adjustment of the nutrient solution variables in a single event, after which the nutrient solution is returned at each of the levels of the structure 1100 to continue the growth of the plants until a decompensation occurs again and it requires to be readjusted or, where appropriate, renewed. The conduction of monotube nutrient solution for filling and draining thereof, is possible by the use and arrangement of the stop valves system 1360 that allows controlling the flow direction, in addition to fine particle filtration and UV disinfection of the nutrient solution both in draining and filling only using said hydraulic pump 1320, UV disinfection lamp 1340 (with flow capacity according to the capacity of the hydraulic pump) and said ring filter 1330.

Likewise, the hydroponic system 1000 of the present invention contemplates greater versatility in the nutrient solution application technique, being a combination of NFT system and floating root. This is possible through the interconnection of the trays by means of the designed draining-filling system 1200. This arrangement avoids the disadvantages generated by the NFT and floating root techniques separately, since by establishing a draining-filling system in the trays containing nutrient solution allows said solution to be returned to the central tank 1310 to be readjusted and returned to the plastic liners 1140 by means of the hydraulic pump 1320 and the same 1200 draining-filling system, thereby improving the management and control of nutrient solution, in addition to generating passive oxygenation since air pumps are not required due to the fact that in the draining process a contact between the nutrient solution with the air is generated through a free fall to the central tank, on the other hand, short periods of operation of the hydraulic pump are maintained unlike the NFT that requires constant operation, also allowing less use of electrical power.

Likewise, the combination and arrangement of the central draining-filling system 1200 and the central pumping-filtering-disinfection system 1300 allows filtering and disinfection to be carried out both in the draining and in the same filling process, in addition to presenting the great advantage that this central system can be connected to "n" number of production structures.

The versatility of this hydroponic system arrangement also allows it to be used to irrigate crops that require the use of substrate (seedling and strawberry production) through the sub-irrigation technique (water is delivered to the root zone of the pant below the substrate surface and is absorbed upwards), allowing the collection and reuse of excess nutrient solution (this system enables the reuse of nutrient solution, thus reducing the cost of operation and increasing the efficient use of water). On the other hand, the system can also be used for drip irrigation using self-compensated drippers (they work from a predetermined pressure) which allow maintaining the irrigation uniformity at all of the levels of the tower regardless the height thereof. On the other hand, the system can admit the integration of a drip system for the production of species such as strawberries and medicinal plants that require the use of pots with substrate and that have low tolerance of electrical conductivity (an increase in electric conductivity greater than 2.5 mS/cm may occur in the root area due to the accumulation of salts in the substrate due to water evaporation in combination with the use of the sub-irrigation irrigation method), the drip system contemplates the use of self-compensating drippers (they work when a certain pressure is reached in the distribution pipe lines of the entire system), which allows maintaining a irrigation uniformity at all of the levels of the tower regardless of its height.

According to the previous, it will be evident to a person skilled in the art that the embodiments of the vertical hydroponic system with environmental control for horticultural production of the present invention and their respective features and components described above are presented for illustrative purposes only, since numerous variations thereto can be made by those skilled in the art, as long as they are made in accordance with the principles of the present invention. As a consequence of the foregoing, the present invention includes all of the embodiments that a person skilled in the art can raise based on the concepts contained in the present description, in accordance with the following claims.

The invention claimed is:

1. A vertical hydroponic system with environmental control for horticultural production comprising:
   a plurality of production structures, each one comprising:
   a plurality of levels, the levels are separated from each other for the production of seedlings and short species, wherein each level contains a stainless-steel tray with a fold to facilitate handling;
   a black high-density polyethylene plastic liner adapted to control proliferation of algae, said black high-density polyethylene plastic liner covers the stainless-steel tray to improve oxygenation and hydration of a substrate, avoid damage to soilless hanging roots of seedlings, and improve draining of unabsorbed nutrient solution, wherein each tray includes inside four perforation propagation containers for seedling production, and a corrugated plastic lid having perforations, each one of the perforations are configured to receive a basket for hydroponic production, for crop production using a hybird floating root-NFT technique;
   wherein each stainless-steel tray and black high-density polyethylene plastic liner contains an insert through hole; and
   a draining-filling system including a plurality of fill-drain lines connected to each of said plurality of stainless-steel trays and the black high-density polyethylene liner through insertion through holes, wherein each fill-drain line comprising:
   a flange to join the black high-density polyethylene plastic liner to the stainless steel tray, said flange comprises an upper basket that acts as a pre-filter to remove particles and plant debris on the substrate, said flange is fluidly connected to a pipe with a flexible part that allows a horizontal displacement of the stainless steel tray by a rail having a safety stop to facilitate harvesting activities, and a rigid part having a flexible polyvinyl chloride (PVC) universal nipple;
   a reducer coupling having installed a stop valve, wherein the reducer coupling and the stop valve are located in each one of the levels to contain a nutrient solution or to control the filling-draining of the tray;
   a central pumping-filtering-disinfection system comprising a water tank; a hydraulic pump; a ring filter; a UV lamp; and a pipe for conducting nutrient solution;
   an automated LED lighting system including a plurality of modules, each module having at least two tubular LED lamps, wherein each of said plurality of modules is placed on each one of the levels and are located and fixed in a parallel position to the stainless steel tray by using fastening clips, which allow to modify a separation of a height between the lamp and a canopy of a plant to adjust a light intensity and to save electrical energy; wherein each tubular LED lamp is designed considering red and white horticultural diodes with specific light intensity and red:blue spectrum ratio;
   a hot/cold temperature control system having an inverter technology; and
   a relative humidity control system including an air extractor, an ultrasonic humidifier for horticultural applications having a tray for containing water and a fan for the distribution of water vapor; and a digital controller having an alarm and a first actuator system for the humidifier and a second actuator system for the extractor, wherein the first and second actuator systems are activated if an established value is different from a current environmental reading; and
   an air movement system to homogenize environmental variables at the entire production area, the environmental variables selected from the group consisting of temperature, relative humidity, vapor pressure deficit, and $CO_2$ concentration.

2. The vertical hydroponic system according to claim 1, wherein said production structure further comprises a medium.

3. The vertical hydroponic system according to claim 1, wherein the black high-density polyethylene plastic liners are placed completely horizontal in the stainless-steel tray; and
   wherein the black high-density polyethylene plastic liners are supported by a pair of opposite placed rails.

4. The vertical hydroponic system according to claim 1, wherein said central system contemplates a free fall of nutrient solution to the tank to allow a passive oxygenation avoiding the use of active oxygenation systems and air pumps.

5. The vertical hydroponic system according to claim 1, wherein said tubular lamps have a wavelength in an electromagnetic spectrum corresponding to a red:blue and a red:far red.

6. The vertical hydroponic system according to claim 1, wherein said tubular lamps have a wavelength in an electromagnetic spectrum corresponding to the green color.

7. The vertical hydroponic system according to claim 1, wherein said digital controller further comprising a relative humidity sensor which, together with the alarm and two actuators control system, allow to manipulate the degree of permissible variability of the environmental relative humidity based on the cultivated plant species.

* * * * *